United States Patent [19]
Wright

[11] 3,824,761
[45] July 23, 1974

[54] METHOD OF MANUFACTURE OF CROWN CLOSURES FROM THERMOPLASTIC MATERIAL

[75] Inventor: Harold B. Wright, McLean, Va.

[73] Assignee: Shenandoah Plastics Corporation, Frederick, Md.

[22] Filed: Sept. 11, 1972

[21] Appl. No.: 287,847

Related U.S. Application Data

[62] Division of Ser. No. 34,147, May 4, 1970, abandoned.

[52] U.S. Cl. .................. 53/41, 264/151, 425/304
[51] Int. Cl. ...................... B65b 7/28, B67b 1/02
[58] Field of Search ......... 53/42, 43, 290, 296, 389, 53/41, 331, 341, 359; 264/151, 132, 153, 284; 425/304, 385; 215/41

[56] References Cited
UNITED STATES PATENTS

| | | | |
|---|---|---|---|
| 1,958,769 | 5/1934 | Rundell | 53/290 X |
| 2,175,338 | 10/1939 | Booth | 53/296 X |
| 2,325,309 | 7/1943 | Swart | 53/42 X |
| 2,447,690 | 8/1948 | Ekstedt et al. | 53/42 X |
| 2,548,306 | 4/1951 | Gora | 264/153 X |
| 3,148,103 | 9/1964 | Gallagher | 264/294 X |
| 3,247,994 | 4/1966 | Fuglsang-Madsen et al. | 215/41 |
| 3,454,694 | 7/1969 | Delaire et al. | 264/151 |
| 3,523,474 | 8/1970 | Kinslow, Jr. | 264/153 |

*Primary Examiner*—Andrew R. Juhasz
*Assistant Examiner*—Horace M. Culver
*Attorney, Agent, or Firm*—Wolfe, Hubbard, Leydig, Voit & Osann, Ltd.

[57] ABSTRACT

A crown for bottles and method for continuous manufacture of the crown from thermoplastic sheet material. The crown has a shaped undersurface conformed to the mouth of bottles as an aid in sealing.

6 Claims, 12 Drawing Figures

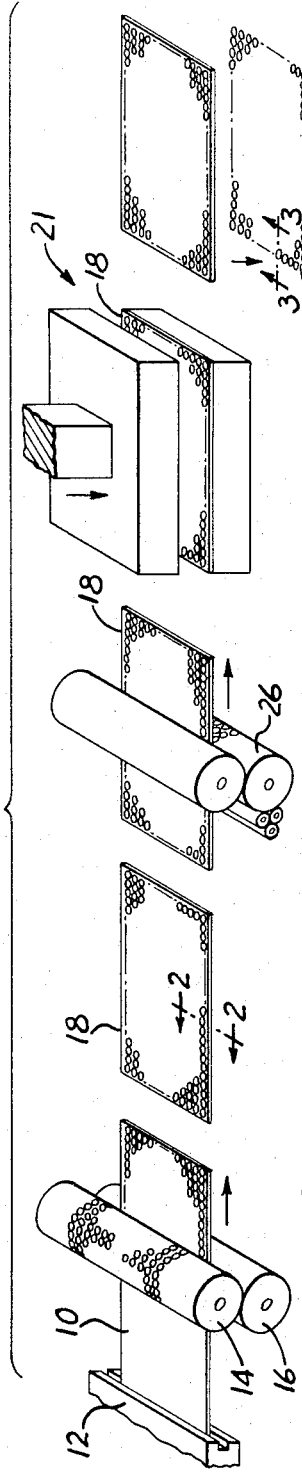

METHOD OF MANUFACTURE OF CROWN CLOSURES FROM THERMOPLASTIC MATERIAL

This application is a division of my application Ser. No. 34,147, filed May 4, 1970, and now abandoned.

DESCRIPTION OF THE INVENTION

This invention relates generally to bottle crowns and more particularly to a method for continuous manufacture of crowns of thermoplastic material.

Heretofore, it has been conventional to manufacture bottle crowns of metal with cork or plastic inserts.

It is proposed, according to this invention, to manufacture crowns exclusively of thermoplastic material, and thereby overcome the fabrication and use problems found with conventional crowns including forming difficulties and corroding of metal crowns which raise a health hazard since corroding may spoil the purity of the bottle contents.

The main object of this invention is to provide an all thermoplastic bottle crown with a cross section which utilizes internal stresses introduced into the material in the course of applying the closure to bottles to clamp and seal the closure to the bottle lip.

Another object of the invention is to provide a continuous process for the manufacture of thermoplastic bottle crowns to take advantage of the lower cost of thermoplastic material as compared with metal and combinations of metal and soft sealing elements used conventionally in the manufacture of crown closures.

Other objects will appear from the following detailed description taken in conjunction with the accompanying drawings in which:

FIG. 1 is a schematic perspective view of the process of this invention for continuous manufacture of bottle crowns;

FIG. 2 is a fragmentary enlarged cross sectional view illustrating the diametral cross section of an embossment in a sheet of thermoplastic material formed as an intermediate step in the process illustrated in FIG. 1, and which after further processing becomes an individual crown closure, and is taken along the plane of lines 2—2 in FIG. 1;

FIG. 3 is an enlarged fragmentary view of a partially formed crown closure after the punching and forming operation carried out as one step in the process illustrated in FIG. 1, and is taken substantially in the plane of lines 3—3 of FIG. 1;

FIG. 4 is a schematic view in cross section illustrating the partially formed crown closure being applied to a bottle;

FIG. 5 is a sectional view showing the crown closure in position upon the lip of a glass bottle;

FIG. 6 is an enlarged fragmentary view of a portion of the crown closure shown in position upon the lip of a glass bottle;

FIG. 7 is an enlarged fragmentary cross sectional view, similar to FIG. 2, of an alternative form of embossment on a sheet of thermoplastic material, to ultimately provide an alternative form of crown closure constructed in accordance with the invention;

FIG. 8 is an enlarged cross sectional view similar to FIG. 3 of a partially formed crown closure having the alternative cross sectional configuration;

FIG. 9 is a cross sectional view illustrating the application of the partially formed crown closure of FIG. 8 being applied to a bottle;

FIG. 10 is a sectional view showing the crown closure partially formed in FIG. 8 in position upon the lip of a glass bottle;

FIG. 11 is an enlarged fragmentary view of a portion of the crown closure shown in position on the lip of the bottle in FIG. 10; and FIG. 12 is a view similar to FIGS. 3 and 8 of a partially formed crown closure, and illustrating an alternative construction utilizing a lamination of materials to form the closure.

Turning to the drawings, FIG. 1 depicts a continuous process for the manufacture of crown closures from thermoplastic material embodying a preferred form of the process of this invention. Thus, according to this invention, the process involves the successive steps: extruding a continuous sheet 10 from a die 12; embossing the continuous sheet as a first forming step by passing it between a heated embossing roll 14 and a backup roll 16; shearing the continuous sheet into individual sheets 18; and punching circular elements from the individual sheets and upsetting the elements in a second forming step to provide partially formed crowns 20, one of which is shown in section in FIG. 3, as by means of a punch press die stamping arrangement 21. The partially formed crowns 20 may be applied to a bottle and their final crimped shape produced by a third forming step, herein shown in FIG. 4 being carried out by a capping ring 22 which is adapted to force the crown 20 onto the lip 24 of a bottle and crimp it into position as shown in FIG. 5. Further, the partially formed crowns may be preheated before being applied to the bottle lip, to facilitate the radial expansion of the crown to fit onto the bottle lip and the achievement of the final crimped shape.

As an important feature of the invention, as an intermediate step in the process, before the crowns 20 are blanked from the individual sheets 18, the smooth surface of the caps (appearing in FIG. 1, for ease in overall illustration, on the underside of the sheets) may be printed and decorated using any conventional printing process, illustratively an offset printing roll 26.

Turning now to FIGS. 5 and 6, in accordance with the product aspects of this invention, the individual crowns 20 embody a construction which utilizes the properties of the thermoplastic material from which they are made, and internal stresses introduced into the material in the course of applying the crowns to bottles, to clamp and seal the crown to the bottle lip. Thus, FIGS. 2-5 illustrate a preferred cross sectional configuration for bottle crowns constructed according to this invention. Referring to FIG. 2, this illustrates a fragmentary cross sectional view through an individual embossment of the multiplicity covering the sheet made by the embossing roll in the process shown in FIG. 1. This illustrates the shape of the sheet before the punching operation to remove the individual crowns. One surface of the sheet is preferably smooth, and this ultimately will provide the exposed top surface of the crown when positioned on a bottle.

The individual embossments covering the other surface of the sheet, in order to make crowns of the preferred form of FIGS. 2-5, have a cross section which varies across their diameter in accordance with a preferred and predetermined pattern. To carry out the invention, the crown is shaped so that in the course of applying it to the bottle lip, residual stresses are introduced into the crown material which tend both to clamp the crown in place on the bottle lip and to provide the required seal. In keeping therewith, as shown in FIG. 2, the embossments have a central section 28 with a diameter D sized for a tight fit in the bottle opening 30. An annular groove 32 surrounds the central section 28 of the crown. This provides a thin section of material in the form of an annular ring 33 in the region of the bottom of the annular groove 32. By virtue of this construction, as the crown is crimped on the bottle, the bottom and side walls of this groove 32 are forced against the rounded top surface and the perimeter of the bottle lip, the particular shape of the groove 32 being determined by the shape of the bottle lip to which the crown will be applied, it being desired to have a close fit of the crown material on the top of the lip.

The crown is also shaped with a thick flange 34 near its outer extremity, and as shown in FIG. 3, in the partially upset form, the flange presents a diameter D1 slightly larger than the largest outer diameter D2 of the bottle lip.

Accordingly, as the crown is applied to the bottle lip by means herein shown in FIG. 4 as a capping ring 22, the flange 34 is forced downward past the region of maximum diameter D2 of the lip of the bottle and forced radially inward into final position, shown in FIG. 5, below the undercut edge of the lip. During this capping operation the thin annular section 33 of material in the region of the bottom of the groove 32 is stretched, to allow the flange 34 to move downward and to be constricted into a smaller diameter fitting tightly below the undercut edge 39 of the lip. The capping operation is effective to cold work the material of the crown and deform the crown ring into a tightly fitting position against the lip, the tension stresses introduced in the thin section of material 33 in the region of the bottom of the groove 32 producing a pinching effect to hold the crown in position and to maintain the seal between the center section 28 of the crown and the top rounded portions of the bottle lip. FIG. 6 is an enlarged fragmentary view showing the crown closure of FIGS. 2–5 in position on the bottle lip, and the arrows in this Figure illustrate the pinching effect on the bottle lip produced by the residual tension stresses due to the stretching of the thin section of material 33 at the bottom of the groove 32.

Referring to FIGS. 7 to 11, these figures show an alternative crown closure structure which is partially upset and then applied to a bottle following the same steps illustrated in FIGS. 3–5. The individual embossments in the sheet, according to this embodiment of the invention, have a central section 40 which will ultimately plug the bottle opening, and for this purpose have a diameter D3 sized for a tight fit in the bottle opening 30. An annular groove 42 surrounds the central section 40 which provides a thin section of material in the form of a stretchable annular ring 44. A thick annular flange 46 near the outer extremity of the crown ultimately fits below the undercut edge 48 of the bottle, to hold the crown in place with the same pinching action on the bottle lip produced by the stretching of the thin material 44 which leaves residual tension forces, the pinching action being shown by the arrows in FIG. 11.

As a further embodiment of the invention, the method may be used to produce crown closures 50 (FIG. 12) which are of laminated thermoplastic materials. In this form of the invention, preferably the bottom layer 52 is a relatively soft thermoplastic material while the top layer 54 is a relatively hard thermoplastic material. In this case, the soft layer 52 aids in sealing, while the hard layer provides the requisite strength. Preferably, the two layers of material are laminated before embossing. The laminated sheet is then embossed to produce a multiplicity of embossments, each of which will form a crown. The cross-section of each embossment for such a crown closure 50 includes, as in the other forms of the invention, a center section 56, an annular groove 58, and an enlarged or thickened flange 60 near the outer extremity which serves to hold the crown in place by fitting under the undercut edge of the bottle.

While a wide variety of different thermoplastic resin materials may be used for the crown closures hereinbefore described in connection with FIGS. 2–11, examples of suitable materials are ABS, blends of ABS such as ABS Polycarbonate blends, unplasticized vinyl, and glass fiber filled polyethylene. A preferred material is an ABS with the following properties:

Elongation at break percent — 35
Spec. Gravity — 1.08 Avg.
Hardness, Rockwell, R — 88—100
Izod Impact Strength —
ft. - lbs./in. Notched — 8.0
Tensile Strength, psi — 4,600
Tensile Modulus, —
psi $\times 10^5$ — 2.3
Flexural Strength, psi — 7,200
Flexural Modulus, psi — 2.4
Deflection Temp. °F —
Unannealed 264 psi — 190

These materials are also suitable for the high strength layer 54 of the laminated closure 50 shown in FIG. 12, while a softer, resilient material bonded thereto is required for the sealing layer 52.

I claim as my invention:

1. A process for manufacturing and applying crown closures which comprises the steps of:
   A. extruding a sheet of thermoplastic resin;
   B. embossing one surface of the sheet to produce a multiplicity of circular embossments each of which will form a crown, each embossment having a circular center portion, an annular groove concentric with the center portion leaving a thinner annular section of material adjacent the bottom of the groove, and a thicker annular flange outwardly of said groove;
   C. shearing said circular embossments from the sheet of material to form individual crown elements;
   D. partially upsetting the elements to provide partially formed crowns; and
   E. applying said partially formed crowns to bottles by forcing each crown onto a bottle lip and stretching said thin annular section of material and constricting by cold forming said annular flange, thereby causing said flange and said center portion to pinch the bottle lip and hold the crown in place.

2. A process for continuous manufacture of crown closures which comprises the steps of:
   A. extruding a sheet of thermoplastic resin;

B. embossing one surface of the sheet to produce a multiplicity of circular embossments each of which will form a crown, each embossment having a circular center portion, an annular groove concentric with the center portion leaving a thinner annular section of material adjacent the bottom of the groove, and a thicker annular flange outwardly of said groove;

C. shearing said circular embossments from the sheet of material to form individual crown elements; and D. partially upsetting the elements to provide partially formed crowns; said partially formed crowns being adapted to be applied to bottles by forcing onto the bottle lip and stretching said thin annular section of material and constricting said annular flange.

3. A process for manufacturing and applying crown closures which comprises the steps of:

A. extruding a sheet of thermoplastic resin;

B. embossing one surface of the sheet to produce a multiplicity of circular embossments each of which will form a crown, each embossment having a circular center portion, an annular section concentric with the center portion and a thicker annular flange outwardly of said annular section;

C. shearing said circular embossments from the sheet of material to form individual crown elements; and D. partially upsetting the elements by deforming said annular section and said flange angularly relative to said center section to provide partially formed circular dished crowns; and E. applying said partially formed dished crown to bottles by forcing each crown onto and deforming the crown into tightly fitting position against the bottle lip with said annular section fitting against the top and side of the bottle lip and said flange constricted below the undercut edge of the bottle lip.

4. A process according to claim 3 in which ABS resin is extruded according to step A to produce sheet.

5. A process according to claim 3 in which thermoplastic resin from the group consisting of:

ABS
unplasticized Vinyl
ABS Polycarbonate blends
glass filled polyethylene is extruded according to step A to produce sheet.

6. A process according to claim 3 in which in step E the partially formed dished crown is cold formed into tightly fitting position against the bottle lip.

* * * * *